(12) United States Patent
Murayama et al.

(10) Patent No.: US 7,348,079 B2
(45) Date of Patent: Mar. 25, 2008

(54) MAGNETIC RECORDING MEDIUM

(75) Inventors: Yuichiro Murayama, Kanagawa (JP); Hiroshi Hashimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 202 days.

(21) Appl. No.: 10/725,522

(22) Filed: Dec. 3, 2003

(65) Prior Publication Data
US 2004/0110038 A1  Jun. 10, 2004

(30) Foreign Application Priority Data
Dec. 3, 2002  (JP)  .............................. 2002-351123

(51) Int. Cl.
G11B 5/706 (2006.01)
(52) U.S. Cl. ................ 428/845.5; 428/838; 428/840.1; 428/840.2
(58) Field of Classification Search ................ 428/141, 428/216, 336, 694 BU, 694 BS, 694 BC, 428/323, 329, 840.5, 838, 840, 840.1, 840.2, 428/845.5
See application file for complete search history.

(56) References Cited

U.S. PATENT DOCUMENTS

| | | | | |
|---|---|---|---|---|
| 4,596,747 A * | 6/1986 | Nishimatsu et al. | ..... | 428/840.5 |
| 4,601,947 A * | 7/1986 | Shimada et al. | ............ | 428/336 |
| 4,603,081 A * | 7/1986 | Shimada et al. | ............ | 428/336 |
| 4,637,963 A * | 1/1987 | Nishimatsu et al. | ..... | 428/840.5 |
| 4,671,995 A * | 6/1987 | Sekiya et al. | ............ | 428/840.5 |
| 4,678,708 A * | 7/1987 | Shimada et al. | ............ | 428/336 |
| 4,689,269 A * | 8/1987 | Mukai et al. | ................ | 428/413 |
| 4,702,959 A * | 10/1987 | Shimozawa et al. | ..... | 428/323 |
| 4,746,558 A * | 5/1988 | Shimozawa et al. | ........ | 428/141 |
| 4,780,354 A * | 10/1988 | Nakayama et al. | ......... | 428/141 |
| 4,795,672 A * | 1/1989 | Takeda et al. | ............... | 428/216 |
| 4,801,392 A * | 1/1989 | Adair et al. | ............. | 252/62.54 |
| 4,842,942 A * | 6/1989 | Yatsuka et al. | ........... | 428/425.9 |
| 4,848,348 A * | 7/1989 | Craighead | ................... | 600/396 |
| 4,933,221 A * | 6/1990 | Nishimura et al. | ......... | 428/64.9 |
| 4,975,322 A * | 12/1990 | Hideyama et al. | .......... | 428/323 |
| 5,712,028 A * | 1/1998 | Seki et al. | ................... | 428/216 |
| 6,074,724 A * | 6/2000 | Inaba et al. | ................. | 428/141 |
| 6,331,342 B1 * | 12/2001 | Inoue | ......................... | 428/141 |
| 6,610,426 B2 * | 8/2003 | Hashimoto et al. | ...... | 428/844.6 |
| 6,632,548 B2 * | 10/2003 | Saito et al. | ................ | 428/841 |
| 6,645,648 B2 * | 11/2003 | Doushita et al. | ......... | 428/845.5 |
| 6,759,150 B2 * | 7/2004 | Suzuki et al. | ............ | 428/844.8 |
| 6,767,613 B2 * | 7/2004 | Murayama et al. | ...... | 428/840.5 |
| 6,773,789 B2 * | 8/2004 | Murayama et al. | ...... | 428/840.5 |
| 6,777,061 B2 * | 8/2004 | Kitamura et al. | ........ | 428/840.2 |
| 6,821,602 B2 * | 11/2004 | Kurose et al. | ........... | 428/840.3 |
| 6,936,328 B2 * | 8/2005 | Hayakawa et al. | ......... | 428/141 |
| 6,939,606 B2 * | 9/2005 | Hashimoto et al. | ...... | 428/840.2 |
| 7,041,395 B2 * | 5/2006 | Murayama et al. | ...... | 428/840.5 |
| 7,208,237 B2 * | 4/2007 | Seki et al. | ................ | 428/842.3 |
| 2003/0096139 A1 * | 5/2003 | Murayama et al. | ... | 428/694 BC |
| 2003/0180578 A1 * | 9/2003 | Hayakawa et al. | .... | 428/694 TS |
| 2004/0110038 A1 * | 6/2004 | Murayama et al. | ... | 428/694 BN |
| 2004/0191465 A1 * | 9/2004 | Murayama et al. | ........ | 428/65.5 |
| 2004/0197603 A1 * | 10/2004 | Hashimoto et al. | ... | 428/694 BC |
| 2005/0089721 A1 * | 4/2005 | Murayama et al. | ... | 428/694 BC |
| 2005/0106420 A1 * | 5/2005 | Kurose et al. | ........ | 428/694 BR |
| 2005/0112409 A1 * | 5/2005 | Murayama et al. | ... | 428/694 BA |
| 2005/0112410 A1 * | 5/2005 | Mori et al. | ........... | 428/694 BU |
| 2005/0233179 A1 * | 10/2005 | Murayama et al. | ...... | 428/840.1 |
| 2005/0238925 A1 * | 10/2005 | Murayama et al. | ...... | 428/840.1 |
| 2006/0008681 A1 * | 1/2006 | Hashimoto et al. | ...... | 428/840.2 |
| 2006/0024515 A1 * | 2/2006 | Murayama et al. | ......... | 428/458 |
| 2006/0068233 A1 * | 3/2006 | Murayama et al. | ...... | 428/844.7 |
| 2006/0083953 A1 * | 4/2006 | Murayama et al. | ...... | 428/844.8 |
| 2006/0194081 A1 * | 8/2006 | Murayama et al. | ...... | 428/844.6 |
| 2006/0228590 A1 * | 10/2006 | Hashimoto et al. | ...... | 428/840.5 |
| 2007/0059563 A1 * | 3/2007 | Hashimoto et al. | ...... | 428/840.5 |

FOREIGN PATENT DOCUMENTS

| | | | |
|---|---|---|---|
| DE | 3428943 | A | 2/1985 |
| JP | 60-133529 | A | 7/1985 |
| JP | 60-133530 | A | 7/1985 |
| JP | 09-115130 | | 5/1997 |
| JP | 09115130 | A * | 5/1997 |
| JP | 10-124848 | | 5/1998 |
| JP | 11-096539 | A | 4/1999 |
| JP | 2001-006146 | A | 1/2001 |
| JP | 2001-131258 | A | 5/2001 |
| JP | 2001-134920 | A | 5/2001 |
| JP | 2002-025035 | A | 1/2002 |

OTHER PUBLICATIONS

European Search Report dated Mar. 3, 2004.
Office Action dated Dec. 19, 2006, Japanese Patent Office, Application No. 2002-351123.

* cited by examiner

*Primary Examiner*—Holly Rickman
*Assistant Examiner*—Gary Harris
(74) *Attorney, Agent, or Firm*—Sughrue Mion, PLLC

(57) ABSTRACT

A magnetic recording medium is provided that has on a non-magnetic support, in order, a radiation-cured layer formed by curing a layer containing a radiation curing compound by exposure to radiation, a lower layer having a non-magnetic powder and/or a magnetic powder dispersed in a binder, and at least one magnetic layer having a ferromagnetic powder dispersed in a binder. The binder of at least the magnetic layer is a binder having a glass transition temperature of 100° C. to 200° C., and the magnetic layer has on its surface a number of micro projections having a height of 10 to 20 nm measured by atomic force microscopy (AFM) of 5 to 1,000/100 $\mu m^2$.

21 Claims, No Drawings

MAGNETIC RECORDING MEDIUM

BACKGROUND OF THE INVENTION

1. Field of the Invention

The present invention relates to a magnetic recording medium having provided on a non-magnetic support a lower layer formed by dispersing a non-magnetic powder and/or a magnetic powder in a binder and having provided on the lower layer at least one magnetic layer formed by dispersing a ferromagnetic powder in a binder.

2. Description of the Related Art

Magnetic recording media are widely used as recording tapes, video tapes, flexible disks, etc. In the magnetic recording media, a magnetic layer in which a ferromagnetic powder is dispersed in a binder is layered on a non-magnetic support. The magnetic recording media are required to have high levels of various properties such as electromagnetic conversion characteristics, transport durability, and transport performance. That is, audio tapes for recording and playing back music are required to have high playback performance of original sounds, and video tapes are required to have excellent electromagnetic conversion characteristics such as playback performance of original images. At the same time as being required to have excellent electromagnetic conversion characteristics as described above, the magnetic recording media are required to have good transport durability.

However, since a magnetic layer obtained by coating a support with a coating solution in which a ferromagnetic fine powder has been dispersed in a binder has a high degree of packing of the ferromagnetic fine powder and a low value for elongation at break and is brittle, if the magnetic layer is formed without providing an undercoat layer, it might be easily destroyed by the application of mechanical force and peeled off from the support. An undercoat layer is therefore provided on the support so as to make the magnetic layer adhere strongly to the support.

For example, it is known that a compound having a functional group that is cured by radiation such as an electron beam, that is, a radiation curing compound, is used to form an undercoat layer.

For example, it has been proposed that a magnetic recording medium is prepared by forming an undercoat layer using a difunctional aliphatic compound as the radiation curing compound (ref. JP-A-60-133529, JP-A-60-133530, and JP-A-5-57647 (JP-A denotes a Japanese unexamined patent application publication)). These aliphatic compounds give a cured coating having a glass transition temperature of at most on the order of 40° C., and there is the problem that cohesive failure might occur during a coating step after the undercoat layer is applied. Furthermore, since such a smooth magnetic layer increases the contact surface between the surface of the magnetic layer and a head, the head is easily contaminated during repetitive sliding.

The contamination of the magnetic head can cause degradation in the electromagnetic conversion characteristics. In particular, high recording density equipment has an increased magnetic head rotational speed; in the case of a digital video tape recorder, the magnetic head rotational speed is 9,600 rpm, which is markedly higher than the 1,800 rpm for a consumer analogue video tape recorder and the 5,000 rpm for a business analogue video tape recorder, and the speed at which the magnetic recording medium and the magnetic head slide against each other is correspondingly high. Moreover, the magnetic head used therein is a small-sized type such as a thin film head, and there is a desire for an improvement in the magnetic head contamination caused by a component of the magnetic recording medium.

As a method for improving the above-mentioned problems, there is a method in which the hardness of the magnetic layer is improved by use of a hard binder. For example, a magnetic recording medium employing as the binder a polyurethane having a glass transition temperature of 80° C. or higher (ref. JP-A-2001-131258), and a magnetic recording medium employing as the binder a polyurethane resin containing a dimer diol as a diol component (ref. JP-A-11-96539) have been proposed. Furthermore, a magnetic recording medium employing as the binder of the magnetic layer an aromatic polyester having a glass transition temperature of 80° C. or higher (ref. JP-A-2001-6146), a magnetic recording medium employing a polyvinyl acetal resin having a glass transition temperature of 80° C. or higher (ref. JP-A-2001-134920), and a magnetic recording medium employing a binder having a glass transition temperature of 100° C. or higher (ref. JP-A-2002-25035) have been proposed.

Such use of a resin having a high glass transition temperature (Tg) as the binder enables the coating strength, in particular at high temperature, to be increased and good transport durability to be obtained. However, increasing a cyclic structure or a urethane bond component in order to increase the Tg results in a decrease in the solvent solubility, sufficient dispersibility thus cannot be obtained, and the coating smoothness is thereby degraded, which is a problem.

BRIEF SUMMARY OF THE INVENTION

It is an object of the present invention to provide a magnetic recording medium having excellent transport durability, coating smoothness, electromagnetic conversion characteristics, and long-term storability.

This object of the present invention can be achieved by a magnetic recording medium comprising a non-magnetic support, and provided in order on the support a radiation-cured layer formed by curing a layer containing a radiation curing compound by exposure to radiation; a lower layer comprising a non-magnetic powder and/or a magnetic powder dispersed in a binder; and at least one magnetic layer comprising a ferromagnetic fine powder dispersed in a binder; the binder of at least the magnetic layer comprising a binder having a glass transition temperature of 100° C. to 200° C., and the magnetic layer having on the surface thereof a number of micro projections having a height of 10 to 20 nm measured by atomic force microscopy (AFM) of 5 to 1,000/100 $\mu m^2$.

The present invention can give a remarkably smooth magnetic recording medium having excellent electromagnetic conversion characteristics by coating a non-magnetic support with a radiation curing compound, curing it by exposure to radiation, and then providing a lower layer and a magnetic layer, so that projections on the surface of the non-magnetic support can be buried and, in particular, micro projections of the lower layer and the magnetic layer originating from the projections of the support, which are thought to have a large effect on the electromagnetic conversion characteristics, can be decreased. It can be expected that when the viscosity of the radiation curing compound is a comparatively low 1,000 mPa·s or less at 25° C. its leveling properties during coating will be excellent, and the effect in burying projections on the surface of the support will be large. Furthermore, it can also be expected that since curing is by exposure to radiation, when the lower layer is applied, swelling of the radiation-cured layer due to a lower layer solvent can be suppressed, thereby also giving a smoothing effect.

Moreover, in comparison with conventional binders, use of a binder having a high glass transition temperature of 100 to 200° C. enables plastic flow of a coating due to heat of friction during repetitive sliding to be suppressed, thereby giving excellent transport durability.

Furthermore, since the radiation-cured layer has excellent adhesion to the support and the lower layer, the defect of dropouts easily increasing due to the edge of the magnetic layer coming off as a result of repetitive transport can be lessened.

DETAILED DESCRIPTION OF THE INVENTION (1) Radiation-cured Layer

Examples of the radiation curing compound used in the radiation-cured layer of the present invention include acrylate esters, acrylamides, methacrylate esters, methacrylamides, allyl compounds, vinyl ethers, and vinyl esters, which are compounds having a radiation-functional double bond.

Among these, di- or higher-functional acrylate and methacrylate compounds are preferable, and difunctional acrylate and methacrylate compounds are particularly preferable.

Specific examples of the difunctional radiation curing compounds include those formed by adding acrylic acid or methacrylic acid to an aliphatic diol; for example, ethylene glycol diacrylate, propylene glycol diacrylate, butanediol diacrylate, hexanediol diacrylate, neopentyl glycol diacrylate, ethylene glycol dimethacrylate, propylene glycol dimethacrylate, butanediol dimethacrylate, hexanediol dimethacrylate, and neopentyl glycol dimethacrylate. There are also acrylate compounds and methacrylate compounds of alicyclic diols such as cyclohexanediol diacrylate, cyclohexanediol dimethacrylate, cyclohexane dimethanol diacrylate, cyclohexane dimethanol dimethacrylate, hydrogenated bisphenol A diacrylate, hydrogenated bisphenol A dimethacrylate, hydrogenated bisphenol F diacrylate, hydrogenated bisphenol F dimethacrylate, tricyclodecane dimethanol diacrylate, and tricyclodecane dimethanol dimethacrylate. There can also be cited as examples polyether acrylates and polyether methacrylates formed by adding acrylic acid or methacrylic acid to a polyether polyol such as polyethylene glycol, polypropylene glycol, or polytetramethylene glycol; for example, diethylene glycol diacrylate, triethylene glycol diacrylate, tetraethylene glycol diacrylate, dipropylene glycol diacrylate, tripropylene glycol diacrylate, diethylene glycol dimethacrylate, triethylene glycol dimethacrylate, tetraethylene glycol dimethacrylate, dipropylene glycol dimethacrylate, and tripropylene glycol dimethacrylate.

It is also possible to use a polyester acrylate or a polyester methacrylate in which acrylic acid or methacrylic acid is added to a polyester polyol obtained from a known dibasic acid and a known glycol. It is also possible to use a polyurethane acrylate or a polyurethane methacrylate in which acrylic acid or methacrylic acid is added to a polyurethane obtained by reacting a known polyol or diol with a polyisocyanate.

It is also possible to use those obtained by adding acrylic acid or methacrylic acid to bisphenol A, bisphenol F, hydrogenated bisphenol A, hydrogenated bisphenol F, or an alkylene oxide adduct thereof; an isocyanuric acid alkylene oxide-modified diacrylate, an isocyanuric acid alkylene oxide-modified dimethacrylate, etc.

Specific examples of trifunctional compounds include trimethylolpropane triacrylate, trimethylolethane triacrylate, an alkylene oxide-modified triacrylate of trimethylolpropane, pentaerythritol triacrylate, dipentaerythritol triacrylate, an isocyanuric acid alkylene oxide-modified triacrylate, propionic acid dipentaerythritol triacrylate, a hydroxypivalaldehyde-modified dimethylolpropane triacrylate, trimethylolpropane trimethacrylate, an alkylene oxide-modified trimethacrylate of trimethylolpropane, pentaerythritol trimethacrylate, dipentaerythritol trimethacrylate, an isocyanuric acid alkylene oxide-modified trimethacrylate, propionic acid dipentaerythritol trimethacrylate, and a hydroxypivalaldehyde-modified dimethylolpropane trimethacrylate.

Specific examples of tetra- or higher-functional radiation curing compounds include pentaerythritol tetraacrylate, ditrimethylolpropane tetraacrylate, dipentaerythritol pentaacrylate, propionic acid dipentaerythritol tetraacrylate, dipentaerythritol hexaacrylate, and an alkylene oxide-modified hexaacrylate of phosphazene.

If the number of functional groups is too large or the functional group concentration is too high, shrinkage after curing is too great, and the adhesion to the support is undesirably degraded.

The molecular weight is preferably a comparatively low 2,000 or less, and more preferably 1,000 or less. The lower the molecular weight, the lower the viscosity and the higher the leveling, and the smoothness is thus improved.

The most preferable are difunctional acrylate and methacrylate compounds having a molecular weight of 200 to 600.

Examples of such radiation curing compounds include diethylene glycol diacrylate, triethylene glycol diacrylate, dipropylene glycol diacrylate, tripropylene glycol diacrylate, hydrogenated bisphenol A diacrylate, hydrogenated bisphenol A dimethacrylate, tricyclodecane dimethanol diacrylate, tricyclodecane dimethanol dimethacrylate, and 5-ethyl-2-(2-hydroxy-1,1-dimethylethyl)-5-(hydroxymethyl)-1,3-dioxane diacrylate.

These radiation curing compounds may be used in combination at any mixing ratio. In addition, a known monofunctional acrylate or methacrylate compound described in 'Teienerugi Denshisenshosha no Oyogijutsu (Applied Technology of Low-energy Electron Beam Irradiation) (2000, Published by CMC)', 'UV·EB Kokagijutsu (UV·EB Curing Technology)(1982, Published by Sogo Gijutsu Center)', etc. may be used as a reactive diluent. The reactive diluents have the function of adjusting the physical properties and the curing reaction of the radiation curing compound.

As the reactive diluent, an acrylate compound having an alicyclic hydrocarbon skeleton is preferable. Specific examples thereof include cyclohexyl (meth)acrylate, isobornyl (meth)acrylate, and tetrahydrofurfuryl (meth)acrylate.

The amount of reactive diluent added is preferably 10 wt % to 90 wt % relative to the di- or higher-functional radiation curing compound. The viscosity of the radiation curing compound at 25° C. is preferably 1,000 mPa·s or less, more preferably 5 to 700 mPa·s, and most preferably 5 to 500 mPa·s. When it is 1,000 mPa·s or less, sufficient smoothness can easily be obtained.

The thickness of the radiation-cured layer is preferably 0.1 to 1.0 μm, and more preferably 0.3 to 0.7 μm. When the thickness is in the above-mentioned range, sufficient smoothness can be achieved. Moreover, the coating is easy to dry, and is resistant to cohesive failure.

The radiation-cured layer is formed by coating the non-magnetic support with the radiation curing compound and then exposing the thus-formed layer containing the radiation curing compound to radiation so as to cure it.

The radiation used in the present invention may be an electron beam or ultraviolet rays. When ultraviolet rays are used, it is necessary to add a photopolymerization initiator to a radiation-cured layer coating solution. In the case of curing with an electron beam, no polymerization initiator is required, and it has a deep penetration depth, which is preferable.

With regard to electron beam accelerators that can be used here, there are a scanning system, a double scanning system, and a curtain beam system, and the curtain beam system is preferable since it is comparatively inexpensive and gives a high output. With regard to electron beam characteristics, the acceleration voltage is usually 30 to 1000 kV, and preferably 50 to 300 kV, and the absorbed dose is usually 0.5 to 20 Mrad, and preferably 2 to 10 Mrad. When the acceleration voltage is in the above-mentioned range, the amount of energy penetrating is sufficient, and the efficiency of energy used in polymerization is appropriate, which is economical.

The atmosphere under which the electron beam is applied is preferably controlled by a nitrogen purge so that the concentration of oxygen is 200 ppm or less. When the concentration of oxygen is 200 ppm or less, crosslinking and curing reactions in the vicinity of the surface are not inhibited.

As a light source for the ultraviolet rays, a mercury lamp is used. The mercury lamp is a 20 to 240 W/cm lamp and is used at a speed of 0.3 to 20 m/min. The distance between a substrate and the mercury lamp is generally preferably 1 to 30 cm.

As the photopolymerization initiator used for ultraviolet curing, a radical photopolymerization initiator is used. More particularly, those described in, for example, 'Shinkobunshi Jikkenngaku (New Polymer Experiments), Vol. 2, Chapter 6 Photo/Radiation Polymerization' (Published by Kyoritsu Publishing, 1995, Ed. by the Society of Polymer Science, Japan) can be used. Specific examples thereof include acetophenone, benzophenone, anthraquinone, benzoin ethyl ether, benzyl methyl ketal, benzyl ethyl ketal, benzoin isobutyl ketone, hydroxydimethyl phenyl ketone, 1-hydroxycyclohexyl phenyl ketone, and 2,2-diethoxyacetophenone.

The mixing ratio of the photopolymerization initiator is usually 0.5 to 20 parts by weight relative to 100 parts by weight of the radiation curing compound, preferably 2 to 15 parts by weight, and more preferably 3 to 10 parts by weight.

With regard to the radiation-curing equipment, conditions, etc., known equipment and conditions described in 'UV·EB Kokagijutsu (UV·EB Curing Technology) (1982, published by Sogo Gijutsu Center)', 'Teienerugi Denshisenshosha no Oyogijutsu (Applied Technology of Low-energy Electron Beam Irradiation) (2000, Published by CMC)', etc. can be employed.

(2) Binder Having a Glass Transition Temperature of 100° C. to 200° C.

Binders having a glass transition temperature of 100° C. to 200° C. are now explained.

The glass transition temperature of the binder is usually 100° C. to 200° C., preferably 140° C. to 180° C., and more preferably 150° C. to 170° C. When the glass transition temperature is in the above-mentioned ranges, the strength of the coating at high temperature is good and the durability is correspondingly good. Since the dispersibility is also good, both the electromagnetic conversion characteristics and the durability are improved.

As the binder having a glass transition temperature of 100° C. to 200° C., a polyurethane resin is preferable. As a polyol component of the polyurethane resin, a polyester polyol is preferable. Those having a cyclic structure such as an aromatic ring or a cyclohexane ring are particularly preferable, and as a dibasic acid component of the polyester polyol, a known acid having a cyclic structure such as orthophthalic acid, isophthalic acid, terephthalic acid, naphthalenedicarboxylic acid, sodium 5-sulfoisophthalic acid, or potassium 5-sulfoisophthalic acid can be used.

As the glycol component of the polyester polyol, those below can be used.

Aliphatic glycols such as ethylene glycol, 1,3-propanediol, propylene glycol, neopentyl glycol (NPG), 1,4-butanediol, 1,5-pentanediol, 1,6-hexanediol, 1,8-octanediol, 1,9-nonanediol, 2,2-dimethyl-1,3-propanediol, 3,3-dimethyl-1,5-pentanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, 5-butyl-1,9-nonanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, and 5-butyl-1,9-nonanenediol.

Diols such as bisphenol A, hydrogenated bisphenol A, bisphenol S, hydrogenated bisphenol S, bisphenol P, hydrogenated bisphenol P, tricyclodecanedimethanol, cyclohexane dimethanol, cyclohexanediol, 5,5'-(1-methylethylidene)-bis-(1,1'-bicyclohexyl)-2-ol, 4,4'-(1-methylethylidene)-bis-2-methylcyclohexanol, 5,5'-(1,1'-cyclohexylidene)-bis-(1,1'-bicyclohexyl)-2-ol, 5,5'-(1,1'-cyclohexylmethylene)-bis-(1,1'-bicyclohexyl)-2-ol, hydrogenated terpene diphenol, diphenylbisphenol A, diphenylbisphenol S, diphenylbisphenol P, 9,9-bis-(4-hydroxyphenyl)-fluorene, 4,4'-(3-methylethylidene)-bis-(2-cyclohexyl-5-methylphenol), 4,4'-(3-methylethylidene)-bis-(2-phenyl-5-methylcyclohexanol), 4,4'-(1-phenylethylidene)-bis-(2-phenol), 4,4'-cyclohexylidene-bis-(2-methylphenol), and terpenediphenol; and adducts thereof with ethylene oxide or propylene oxide.

Among the above-mentioned compounds, hydrogenated bisphenol A and the propylene oxide adduct of bisphenol A are preferable.

As a chain extension agent component for the polyurethane, the above-mentioned glycol components can be used. The molecular weight of the chain extension agent is preferably 200 to 500.

As the diisocyanate component of the polyurethane, a known compound can be used, and those having a cyclic structure such as TDI (tolylene diisocyanate), MDI (diphenylmethane diisocyanate), p-phenylene diisocyanate, o-phenylene diisocyanate, m-phenylene diisocyanate, xylylene diisocyanate, hydrogenated xylylene diisocyanate, and isophorone diisocyanate are preferable.

The cyclic structure in the polyurethane is preferably present in the range of 5 to 10 mmol/g. When it is in this range, the glass transition temperature does not become too low and sufficient durability can be obtained. Furthermore, the solvent solubility is not degraded, and sufficient dispersibility can thus be maintained.

The concentration of urethane groups in the polyurethane is preferably in the range of 4 to 6 mmol/g. When it is in this range, the glass transition temperature does not become too low and sufficient durability can be obtained. Furthermore, the solvent solubility is not degraded, and sufficient dispersibility can thus be maintained.

The polyol/chain extension agent (low molecular weight diol)/diisocyanate compound composition in the polyurethane resin is preferably (0 to 30 wt %)/(25 to 45 wt %)/(35 to 60 wt %).

Examples of other resins that can be used include a cellulose resin such as nitrocellulose, cellulose acetate, or cellulose propionate, a vinylic polymer such as polystyrene or polyvinyl acetal, an acrylic resin obtained by copolymerization of methyl (meth)acrylate, t-butyl (meth)acrylate, isobornyl (meth)acrylate, etc., a polyamide resin, a polyimide resin, a polyamideimide resin, a polycarbonate resin, a phenol resin, an epoxy resin, a phenoxy resin, a urea resin, a melamine resin, and a polysulfone, and these resins may be used in combination.

The weight-average molecular weight of the resin used as the binder of the present invention is preferably 30,000 to 200,000, and more preferably 50,000 to 100,000. When the weight-average molecular weight is in the above-mentioned range, the coating strength is good. Furthermore, since the solvent solubility is not degraded, sufficient dispersibility can be maintained.

Moreover, the binder preferably has a functional group (polar group) that can adsorb on the surface of a magnetic powder or a non-magnetic powder in order to improve the dispersibility thereof. Examples of the polar group include —$SO_3M$, —$OSO_3M$, —$PO_3M_2$, —COOM, an epoxy group, and an OH group. Here, M denotes hydrogen or an alkali metal such as Na or K. Among these polar groups, —$SO_3M$ and —$OSO_3M$ are preferable.

The amount of polar groups in the resin is preferably $1 \times 10^{-5}$ eq/g to $3 \times 10^{-4}$ eq/g, and more preferably $5 \times 10^{-5}$ to $2 \times 10^{-4}$ eq/g. When the amount of polar groups is in the above-mentioned range, the adsorption on the magnetic substance and the solvent solubility are sufficient, and the dispersibility is correspondingly good.

(3) Magnetic Layer

The ferromagnetic fine powder used in the magnetic recording medium of the present invention is a cobalt-containing ferromagnetic iron oxide or a ferromagnetic alloy powder, and the $S_{BET}$ specific surface area thereof is preferably 40 to 80 m²/g, and more preferably 50 to 70 m²/g. The crystallite size thereof is preferably 12 to 25 nm, more preferably 13 to 22 nm, and particularly preferably 14 to 20 nm. The major axis length thereof is preferably 0.05 to 0.25 μm, more preferably 0.07 to 0.2 μm, and particularly preferably 0.08 to 0.15 μm.

Examples of the ferromagnetic fine powder include yttrium-containing Fe, Fe—Co, Fe—Ni, and Co—Ni—Fe, and the content of yttrium in the ferromagnetic fine powder is preferably 0.5 atom % to 20 atom % as the yttrium atom/Fe atom ratio Y/Fe, and more preferably 5 to 10 atom %. When it is 0.5 atom % or higher, it is possible to obtain a high σs for the ferromagnetic fine powder, the magnetic properties are improved, and good electromagnetic conversion characteristics can be obtained. When it is 20 atom % or less, the content of iron is appropriate, the magnetic properties are good, and the electromagnetic conversion characteristics are improved. Furthermore, it is also possible for aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium, bismuth, etc. to be present at 20 atom % or less relative to 100 atom % of iron. It is also possible for the ferromagnetic metal powder to contain a small amount of water, a hydroxide, or an oxide.

One example of a process for producing the ferromagnetic fine powder incorporating cobalt or yttrium of the present invention is illustrated below. For example, an iron oxyhydroxide obtained by blowing an oxidizing gas into an aqueous suspension in which a ferrous salt and an alkali have been mixed can be used as a starting material. This iron oxyhydroxide is preferably of the α-FeOOH type, and with regard to a production process therefor, there is a first production process in which a ferrous salt is neutralized with an alkali hydroxide to form an aqueous suspension of Fe(OH)$_2$, and an oxidizing gas is blown into this suspension to give acicular α-FeOOH. There is also a second production process in which a ferrous salt is neutralized with an alkali carbonate to form an aqueous suspension of FeCO$_3$, and an oxidizing gas is blown into this suspension to give spindle-shaped α-FeOOH. Such an iron oxyhydroxide is preferably obtained by reacting an aqueous solution of a ferrous salt with an aqueous solution of an alkali to give an aqueous solution containing ferrous hydroxide, and then oxidizing this with air, etc. In this case, the aqueous solution of the ferrous salt may contain an Ni salt, a salt of an alkaline earth element such as Ca, Ba, or Sr, a Cr salt, a Zn salt, etc., and by selecting these salts appropriately the particle shape (axial ratio), etc. can be adjusted.

As the ferrous salt, ferrous chloride, ferrous sulfate, etc. are preferable. As the alkali, sodium hydroxide, aqueous ammonia, ammonium carbonate, sodium carbonate, etc. are preferable. With regard to salts that can be present at the same time, chlorides such as nickel chloride, calcium chloride, barium chloride, strontium chloride, chromium chloride, and zinc chloride are preferable. In the case where cobalt is subsequently incorporated into the iron, before introducing yttrium, an aqueous solution of a cobalt compound such as cobalt sulfate or cobalt chloride is mixed and stirred with a slurry of the above-mentioned iron oxyhydroxide. After the slurry of iron oxyhydroxide containing cobalt is prepared, an aqueous solution containing a yttrium compound is added to this slurry, and they are stirred and mixed.

Neodymium, samarium, praseodymium, lanthanum, etc. can be incorporated in the ferromagnetic fine powder of the present invention as well as yttrium. They can be incorporated using a chloride such as yttrium chloride, neodymium chloride, samarium chloride, praseodymium chloride, or lanthanum chloride or a nitrate salt such as neodymium nitrate or gadolinium nitrate, and they can be used in a combination of two or more types. The shape of the ferromagnetic fine powder is not particularly limited and, for example, an acicular, granular, cuboidal, rice-grain shaped, or tabular powder is usually used. The use of an acicular ferromagnetic fine powder is particularly preferable.

The above-mentioned binder and ferromagnetic fine powder are kneaded with and dispersed in a solvent such as methyl ethyl ketone, dioxane, cyclohexanone, or ethyl acetate, which are normally used for preparation of a magnetic coating solution, to give a magnetic coating solution. The kneading and dispersing can be carried out by a standard method. The magnetic coating solution can contain in addition to the above-mentioned components a standard additive or filler, for example, an abrasive such as $\alpha$-$Al_2O_3$ or $Cr_2O_3$, an antistatic agent such as carbon black, a lubricant such as a fatty acid, a fatty acid ester, or a silicone oil, or a dispersing agent.

The number of micro projections on the surface of the magnetic layer having a height of 10 to 20 nm measured by atomic force microscopy (AFM) is 5 to 1,000/100 $\mu m^2$, preferably 5 to 200/100 $\mu m^2$, and more preferably 5 to 100/100 $\mu m^2$. When it is less than 5, the coefficient of friction during transport is high and the durability is degraded, and when it exceeds 1,000, the electromagnetic conversion characteristics are degraded.

The thickness of the magnetic layer is preferably 0.05 to 1.0 $\mu m$. When it is in this range, there is hardly any unevenness in the coating thickness and sufficient durability can be obtained.

(4) Lower Layer

The lower layer of the present invention (magnetic layer or non-magnetic layer) is now explained.

When the lower layer of the present invention is a non-magnetic layer, the non-magnetic powder contained in the lower layer can be selected from an inorganic compound such as a metal oxide, a metal carbonate, a metal sulfate, a metal nitride, a metal carbide and a metal sulfide.

As the inorganic compound, $\alpha$-alumina with an $\alpha$-component proportion of 90% to 100%, $\beta$-alumina, $\gamma$-alumina, silicon carbide, chromium oxide, cerium oxide, $\alpha$-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. can be used singly or in combination. Titanium dioxide, zinc oxide, iron oxide and barium sulfate are particularly preferable, and titanium dioxide is more preferable.

The average particle size of such a non-magnetic powder is preferably 0.005 to 2 $\mu m$, but it is also possible, as necessary, to combine non-magnetic powders having different particle sizes or widen the average particle size distribution of a single non-magnetic powder, thus producing the same effect. The average particle size of the non-magnetic powder is particularly preferably 0.01 to 0.2 $\mu m$.

The pH of the non-magnetic powder is particularly preferably in the range of 6 to 9.

The specific surface area of the non-magnetic powder is usually 1 to 100 $m^2/g$, preferably 5 to 50 $m^2/g$, and more preferably 7 to 40 $m^2/g$.

The crystallite size of the non-magnetic powder is preferably 0.01 to 2 $\mu m$.

The oil absorption measured using DBP is 5 to 100 ml/100 g, preferably 10 to 80 ml/100 g, and more preferably 20 to 60 ml/100 g.

The specific gravity is preferably 1 to 12, and more preferably 3 to 6.

The form may be any one of acicular, spherical, polyhedral, and tabular.

The surface of the non-magnetic powder is preferably subjected to a surface treatment so that $Al_2O_3$, $SiO_2$, $TiO_2$, $ZrO_2$, $SnO_2$, $Sb_2O_3$, or ZnO is present thereon. In terms of dispersibility in particular, $Al_2O_3$, $SiO_2$, $TiO_2$, and $ZrO_2$ are preferable, and $Al_2O_3$, $SiO_2$, and $ZrO_2$ are more preferable. They may be used in combination or singly. Depending on the intended purpose, a co-precipitated surface-treated layer may be used, or a method can be employed in which alumina is firstly used for treatment and the surface thereof is then treated with silica, or vice versa. The surface-treated layer may be formed as a porous layer depending on the intended purpose, but it is generally preferable for it to be uniform and dense.

Incorporation of carbon black into the lower layer can give the known effects of a lowering of surface electrical resistance (Rs), and a desired micro Vickers hardness can be obtained. Furnace black for rubber, thermal black for rubber, carbon black for coloring, acetylene black, etc. can be used for the above effects. The specific surface area of the carbon black is preferably 100 to 500 $m^2/g$, and more preferably 150 to 400 $m^2/g$, and the DBP oil absorption thereof is preferably 20 to 400 ml/100 g, and more preferably 30 to 200 ml/100 g. The average particle size of the carbon black is desirably 5 to 80 nm ($\mu m$), preferably 10 to 50 nm ($\mu m$), and more preferably 10 to 40 nm ($\mu m$). The pH thereof is preferably 2 to 10, the water content thereof is preferably 0.1% to 10%, and the tap density is preferably 0.1 to 1 g/ml. Specific examples of the carbon black used in the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, and MA-600 (manufactured by Mitsubishi Chemical Corporation), CONDUCTEX SC, RAVEN 8800, 8000, 7000, 5750, 5250, 3500, 2100, 2000, 1800, 1500, 1255, and 1250 (manufactured by Columbia Carbon Co.), and Ketjen Black EC (manufactured by Akzo).

In the case in which the lower layer of the present invention is a magnetic layer, as the magnetic powder, $\gamma$-$Fe_2O_3$, Co-modified $\gamma$-$Fe_2O_3$, an alloy having $\alpha$-Fe as the main component, $CrO_2$, etc. can be used. In particular, Co-modified $\gamma$-$Fe_2O_3$ is preferable. The magnetic powder used in the lower layer of the present invention preferably has the same composition and performance as that of the ferromagnetic fine powder used in the upper magnetic layer. Changing the performance of the upper and lower layers according to the intended purpose is known. For example, in order to improve long wavelength recording properties, the coercive force (Hc) of the lower magnetic layer is desirably set so as to be lower than that of the upper magnetic layer, and it is effective to set the Br of the lower magnetic layer so as to be higher than that of the upper magnetic layer. In addition to the above, it is also possible to impart advantages arising from the employment of a known multilayer structure.

With regard to a binder, a lubricant, a dispersant, an additive, a solvent, and a dispersion method used for the lower magnetic layer or the lower non-magnetic layer, those described for the magnetic layer can be used. In particular, the types and quantities of the binder resin, the additive, and the dispersant can be determined according to known techniques relating to the magnetic layer.

The magnetic coating solution or the non-magnetic coating solution prepared using the above-mentioned materials is applied on the non-magnetic support so as to form a lower layer.

(5) Non-magnetic Support

With regard to the non-magnetic supports that can be used in the present invention, there are known supports such as biaxially stretched polyethylene naphthalate, polyethylene terephthalate, polyamide, polyimide, polyamideimide, an aromatic polyamide, and polybenzoxidazole. Preferred examples include polyethylene naphthalate and aromatic polyamides. These non-magnetic supports may be subjected beforehand to corona discharge, a plasma treatment, an adhesion promotion treatment, a thermal treatment, etc. The non-magnetic support that can be used in the present invention preferably has a surface having excellent smoothness such that its center line average surface roughness is in the range of 0.1 to 20 nm for a cutoff value of 0.25 mm, and preferably 1 to 10 nm. Furthermore, these non-magnetic supports preferably have not only a small center line average surface roughness but also no coarse projections with a height of 1 µm or higher.

(6) Layer Arrangement

The magnetic recording medium of the present invention has a multilayer structure having on a non-magnetic support a lower layer (non-magnetic layer or magnetic layer) and at least one magnetic layer. By simultaneously multilayer-coating the uppermost magnetic layer and at least the upper magnetic layer adjacent thereto, the binder of the present invention contained in the uppermost magnetic layer diffuses into the upper magnetic layer due to migration, etc., and the upper magnetic layer other than the uppermost magnetic layer substantially contains the binder of the present invention. This effect is outstanding particularly when a thin magnetic layer is used as the upper magnetic layer.

When the upper magnetic layer is a single layer, the thickness thereof is preferably 0.05 to 1.0 µm, and more preferably 0.05 to 0.5 µm. When the thickness of the uppermost magnetic layer is in the above-mentioned range, a magnetic layer having high smoothness and mechanical strength can be obtained.

When the upper magnetic layer comprises a plurality of magnetic layers, the thickness of the uppermost magnetic layer is desirably 0.05 to 1.0 µm, and preferably 0.05 to 0.5 µm, and the overall thickness of the upper magnetic layer is desirably 1.0 to 2.5 µm, and preferably 1.0 to 1.5 µm. When the layer structure of the magnetic layer is in the above-mentioned range, a magnetic layer having high smoothness and mechanical strength can be obtained.

The process for producing the magnetic recording medium of the present invention is for example carried out by coating the surface of a non-magnetic support while it is moving with a lower layer coating solution, and subsequently or simultaneously with a magnetic coating solution so that the magnetic layer has a dry thickness of the above-mentioned preferred magnetic layer thickness and the lower layer preferably has a dry thickness of 1.0 to 2.0 µm, and more preferably 1.0 to 1.5 µm.

As coating equipment for applying the above-mentioned magnetic coating solution, an air doctor coater, a blade coater, a rod coater, an extrusion coater, an air knife coater, a squeegee coater, a dip coater, a reverse roll coater, a transfer roll coater, a gravure coater, a kiss coater, a cast coater, a spray coater, a spin coater, etc. can be used. With regard to these, for example, 'Saishin Kotingu Gijutsu (Latest Coating Technology)' (May 31, 1983) published by Sogo Gijutsu Center can be referred to.

Examples of the coating equipment and the coating method for the magnetic recording medium of the present invention are proposed as follows.

(1) A lower layer is firstly applied by coating equipment such as gravure, roll, blade, or extrusion, which is generally used for coating with a magnetic coating solution, and an upper layer is applied by a pressurized support type extrusion coating device such as one disclosed in JP-B-146186 (JP-B denotes a Japanese examined patent application publication), JP-A-60-238179, or JP-A-2-265672 before the lower layer has dried.

(2) Upper and lower layers are substantially simultaneously applied by means of one coating head having two coating solution passing slits, such as one disclosed in JP-A-63-88080, JP-A-2-17971, or JP-A-2-265672.

(3) Upper and lower layers are substantially simultaneously applied by means of an extrusion coating device with a backup roll, such as one disclosed in JP-A-2-174965.

The surface of the non-magnetic support used in the present invention that has not been coated with the magnetic coating solution may be provided with a back layer (backing layer). The back layer is usually a layer provided by coating the surface of the non-magnetic support that has not been coated with the magnetic coating solution with a back layer-forming coating solution in which a particulate component such as an abrasive or an antistatic agent and a binder have been dispersed in an organic solvent. An adhesive layer may be provided on the surfaces of the non-magnetic support that are to be coated with the magnetic coating solution and the backcoat layer-forming coating solution. The coated layer of the magnetic coating solution thus applied is dried after subjecting the ferromagnetic powder contained in the coated layer of the magnetic coating solution to a magnetic field alignment treatment.

After drying is carried out in this way, it is preferable to subject the coated layer to a surface smoothing treatment. The surface smoothing treatment employs, for example, super calender rolls, etc. By carrying out the surface smoothing treatment, cavities formed by removal of the solvent during drying are eliminated, thereby increasing the packing ratio of the ferromagnetic powder in the magnetic layer, and a magnetic recording medium having high electromagnetic conversion characteristics can thus be obtained. With regard to calendering rolls, rolls of a heat-resistant plastic such as epoxy, polyimide, polyamide, or polyamideimide are used. It is also possible to treat with metal rolls, which is desirable and preferable.

The magnetic recording medium of the present invention preferably has a magnetic layer whose surface has a center line average roughness in the range of 0.1 to 4 nm for a cutoff value of 0.25 mm, and preferably 1 to 3 nm, which is extremely smooth. As a method therefor, a magnetic layer formed by selecting a specific ferromagnetic powder and binder as described above is subjected to the above-mentioned calendering treatment. The magnetic recording medium thus obtained can be used by cutting into a desired size by means of a cutter, etc.

In accordance with the magnetic recording medium of the present invention, since the number of micro projections on the coating surface could be reduced, the electromagnetic conversion characteristics improved. Furthermore, damage to the coating due to repetitive transport and increase in the number of dropouts due to repetitive transport could be suppressed.

EXAMPLES

Example of Synthesis of Polyurethane Resin Solution

Polyester polyol and diol components were dissolved under a flow of nitrogen at 60° C. at the amounts shown in Table 1 in a 30% cyclohexanone solution in a vessel that was equipped with a reflux-type condenser and a stirrer and that had been pre-flushed with nitrogen. Subsequently, 60 ppm of dibutyltin dilaurate was added thereto as a catalyst, and was dissolved for a further 15 minutes. The amount of diisocyanate compound shown in Table 1 was added thereto, and a reaction was carried out by heating at 90° C. for 6 hours to give polyurethane resin solutions A to H.

The Mw and Tg of the polyurethanes thus obtained are shown in Table 1.

The Mw was measured in THF solvent by GPC using polystyrene as a standard.

The Tg (glass transition temperature) was obtained by measuring the loss modulus (E") peak temperature using a dynamic viscoelastometer at 110 Hz and a temperature increase of 2° C./min.

Example 1

'Parts' in Examples denotes 'parts by weight'.

Preparation of Upper Layer Magnetic Coating Solution 100 parts of a ferromagnetic alloy powder (composition: Fe 89 atm %, Co 5 atm %, Y 6 atm %, coercive force (Hc) 159.2 kA/m (2,000 Oe), crystallite size 15 nm, BET specific surface area 59 m$^2$/g, major axis length 0.12 µm, acicular ratio 7, saturation magnetization (σs) 150 A·m$^2$/kg (150 emu/g)) was ground in an open kneader for 10 minutes, subsequently 10 parts (solids content) of the binder shown in Table 2 was added thereto, and 30 parts of cyclohexanone was further added thereto, and the mixture was kneaded for 60 minutes.

Subsequently,

| | |
|---|---|
| an abrasive (Al$_2$O$_3$ particle size 0.3 µm) | 2 parts, |
| carbon black (particle size 40 µm) | 2 parts, and |
| methyl ethyl ketone/toluene = 1/1 | 200 parts | were added thereto, and the mixture was dispersed in a sand mill for 120 minutes.

| | |
|---|---|
| A polyisocyanate (Coronate 3041, manufactured by Nippon Polyurethane Industry Co., Ltd.) | 5 parts (solids content), |
| butyl stearate | 2 parts, |
| stearic acid | 1 part, and |
| methyl ethyl ketone | 50 parts |

TABLE 1

Polyurethane synthesis example mol %

| | Polyester polyol | Chain extension agent | | Compound E | Diisocyanate MDI | Mw | Tg (° C.) |
|---|---|---|---|---|---|---|---|
| Polyurethane A | 15 | Compound A | 35 | 2 | 48 | 51000 | 100 |
| Polyurethane B | 10 | Compound B | 40 | 2 | 48 | 48000 | 120 |
| Polyurethane C | 10 | Compound A | 40 | 2 | 48 | 62000 | 140 |
| Polyurethane D | 5 | Compound A | 45 | 2 | 48 | 45000 | 200 |
| Polyurethane E | — | Compound C | 48 | 2 | 48 | 53000 | 130 |
| Polyurethane F | — | Compound D | 48 | 2 | 48 | 47000 | 145 |
| Polyurethane G | 20 | Compound A | 30 | 2 | 48 | 55000 | 90 |
| Polyurethane H | — | Compound A | 50 | 2 | 48 | 56000 | 220 |

Polyester polyol isophthalic acid/2,2-dimethyl-1,3-propanediol = 2/3 molar ratio copolymer (number-average molecular weight 570)
Compound A hydrogenated bisphenol A
Compound B adduct of 2 moles of propylene oxide with bisphenol A (molecular weight 372)
Compound C 2-ethyl-2-butyl-1,3-propanediol
Compound D 2,2-diethyl-1,3-propanediol
Compound E Na sulfoisophthalic acid ethylene oxide adduct (molecular weight 356)
MDI diphenylmethane diisocyanate were further added thereto, the mixture was stirred and mixed for a further 20 minutes, and filtered using a filter having an average pore size of 1 μm to give an upper layer magnetic coating solution.

Preparation of Lower Layer Non-magnetic Coating Solution 100 parts of α-Fe$_2$O$_3$ (average particle size 0.15 μm, S$_{BET}$ 52 m$^2$/g, surface-treated with Al$_2$O$_3$ and SiO$_2$, pH 6.5 to 8.0) was ground in an open kneader for 10 minutes, subsequently 18 parts (solids content) of the binder shown in Table 2 was added thereto, 30 parts of cyclohexanone was further added thereto, and the mixture was kneaded for 60 minutes.

Subsequently,

| | |
|---|---|
| methyl ethyl ketone/cyclohexanone = 6/4 | 200 parts |
| was added thereto, and the mixture was dispersed in a sand mill for 120 minutes. To this mixture, | |
| butyl stearate | 2 parts, |
| stearic acid | 1 part, and |
| methyl ethyl ketone | 50 parts | were added and the mixture was stirred and mixed for a further 20 minutes, and filtered using a filter having an average pore size of 1 μm to give a lower layer non-magnetic coating solution.

Subsequently, the surface of a polyethylene terephthalate support having a thickness of 7 μm and a center plane average surface roughness Ra of 6.2 nm was coated with a 30 wt % solution (MEK solution) of the radiation-curing compound shown in Table 2 by a coiled bar so that the dry thickness thereof was 0.5 μm, dried, and cured by irradiating the coating surface with an electron beam at an acceleration voltage of 150 KV and an absorbed dose of 1 Mrad.

Subsequently, the top of the radiation-cured layer was coated with a lower layer non-magnetic coating solution, on top of which was further applied an upper layer magnetic coating solution by simultaneous reverse roll multilayer coating so that the dry thicknesses thereof were 1.5 μm and 0.1 μm respectively. Before the upper layer magnetic coating solution had dried, it was subjected to magnetic field alignment using a 500 mT (5,000 G) Co magnet and a 400 mT (4,000 G) solenoid magnet, and after the solvent was removed by drying, it was subjected to a calender treatment employing a metal roll-metal roll-metal roll-metal roll-metal roll-metal roll-metal roll combination (speed 100 m/min, line pressure 300 kg/cm, temperature 90° C.) and then slit to a width of 3.8 mm to give a magnetic tape.

Examples 2 to 8 and Comparative Examples 1 to 4

The procedure of Example 1 was repeated except that the radiation curing compounds, the lower layer binders, and the upper layer binders shown in Table 2 were used.

Measurement Methods (1) Glass Transition Temperature of Binder

Measurement was carried out using a Rheovibron dynamic viscoelastometer manufactured by A&D at a frequency of 110 Hz with a temperature increase of 2° C./min, and the loss modulus peak temperature was used.

(2) Number of Micro Projections

The number of projections per 10 μm square (100 μm$^2$) was measured at every 5 nm up to a height of 20 nm using a Nanoscope III (AFM: atomic force microscope) manufactured by Digital Instruments with a four-sided pyramidal SiN probe having a tip angle of 70°.

(3) Electromagnetic Conversion Characteristics

A single frequency signal at 4.7 MHz was recorded using a DDS4 drive at an optimum recording current, and its playback output was measured. The playback output was expressed as a relative value where the playback output of Comparative Example 1 was 0 dB.

(4) Repetitive Transport Properties

The surface of a magnetic layer was placed in contact with a guide pole used in a DDS4 drive at 50° C. and 20% RH with a load of 20 g and, after repetitively passing 800 times at 8 mm/sec, the surface of the magnetic layer was inspected by a differential interference optical microscope and evaluated using the criteria below.

Excellent: no scratches.

Good: some scratches, but more parts without scratches.

Poor: more parts with scratches than parts without scratches.

(5) Increase in Dropouts (D.O.)

Dropouts are defined as being a decrease of −5 dB for 5 μsec or longer relative to the initial output. They were measured using a dropout counter for 1 minute before and after transporting a 10 minute long tape repetitively 100 times at 50° C. and 20% RH using a DDS4 drive, and the increase in the number of dropouts after the repetitive transport was obtained.

The results of measurement are given in Table 2.

The types of binders and the results of measurement of the glass transition temperature are given in Table 3.

TABLE 2

| | Radiation-curing compound | Lower layer binder | Magnetic layer binder | Number of magnetic layer micro projections | Electromagnetic conversion characteristics (dB) | Repetitive transport characteristics | D.O. Increase (number) |
|---|---|---|---|---|---|---|---|
| Ex. 1 | Comp. A | Binder A | Binder A | 5 | 2.1 | Excellent | 10 |
| Ex. 2 | Comp. B | " | " | 10 | 1.8 | Excellent | 12 |
| Ex. 3 | Comp. C | " | " | 10 | 1.7 | Excellent | 12 |
| Ex. 4 | Comp. D | " | " | 15 | 1.2 | Excellent | 10 |
| Ex. 5 | Comp. A | Binder B | Binder B | 50 | 0.9 | Excellent | 15 |
| Ex. 6 | " | Binder C | Binder C | 40 | 0.5 | Excellent | 15 |
| Ex. 7 | " | Binder D | Binder D | 850 | 0.5 | Excellent | 35 |
| Ex. 8 | " | Binder E | Binder E | 35 | 1.1 | Excellent | 40 |
| Ex. 9 | " | Binder F | Binder F | 65 | 1 | Excellent | 45 |
| Ex. 10 | " | Binder I | Binder I | 120 | 0.8 | Excellent | 45 |
| Ex. 11 | " | Binder J | Binder J | 134 | 0.8 | Excellent | 53 |

TABLE 2-continued

| | Radiation-curing compound | Lower layer binder | Magnetic layer binder | Number of magnetic layer micro projections | Electromagnetic conversion characteristics (dB) | Repetitive transport characteristics | D.O. Increase (number) |
|---|---|---|---|---|---|---|---|
| Ex. 12 | " | Binder G | Binder A | 850 | 0.5 | Excellent | 20 |
| Comp. Ex. 1 | None | Binder A | Binder A | 1600 | 0 | Poor | 130 |
| Comp. Ex. 2 | Comp. A | Binder G | Binder G | 1200 | 0 | Good | 85 |
| Comp. Ex. 3 | " | Binder H | Binder H | 1400 | −0.1 | Good | 75 |
| Comp. Ex. 4 | " | Binder K | Binder K | 1200 | 0 | Good | 210 |

Compound A tripropylene glycol diacrylate (viscosity 10 mPa · s at 25° C.)
Compound B tricyclodecane dimethanol diacrylate (viscosity 150 mPa · s at 25° C.)
Compound C 5-ethyl-2-(2-hydroxy-1,1-dimethylethyl)-5-(hydroxymethyl)-1,3-dioxane diacrylate (viscosity 300 mPa · s at 25° C.)
Compound D diacrylate of adduct of 4 moles of ethylene oxide with bisphenol A (viscosity 800 mPa · s at 25° C.)

TABLE 3

| Binder | | Tg (° C.) |
|---|---|---|
| A | Polyurethane resin A | 100 |
| B | Polyurethane resin B | 120 |
| C | Polyurethane resin C | 140 |
| D | Polyurethane resin D | 200 |
| E | Polyurethane resin E | 130 |
| F | Polyurethane resin F | 145 |
| G | Polyurethane resin G | 90 |
| H | Polyurethane resin H | 220 |
| I | $SO_3Na$-containing cellulose acetate propionate resin (Mw 70,000, $SO_3Na$ 6 × $10^{-5}$ eq/g) | 150 |
| J | $SO_3Na$-containing cellulose acetate butyrate resin (Mw 100,000, $SO_3Na$ 6 × $10^{-5}$ eq/g) | 130 |
| K | Vinyl chloride copolymer (MR110 Mw 60,000 manufactured by Zeon Corporation) | 80 |

What is claimed is:

1. A magnetic recording medium comprising:
a non-magnetic support, and provided in order on the support:
a radiation-cured layer formed by curing a layer containing a radiation curing compound by exposure to radiation, wherein the molecular weight of the radiation curing compound is 1,000 or less;
a lower layer comprising a non-magnetic powder and/or a magnetic powder dispersed in a binder; and
at least one magnetic layer comprising a ferromagnetic powder dispersed in a binder;
the binder of at least the magnetic layer comprising a binder having a glass transition temperature of 100° C. to 200° C., and
the at least one magnetic layer having on the surface thereof a number of micro projections having a height of 10 to 20 nm measured by atomic force microscopy (AFM) of 5 to 1,000/100 μm², and the at least one magnetic layer having a thickness of 0.05 to 1.0 μm.

2. The magnetic recording medium according to claim 1, wherein the at least one magnetic layer has on the surface thereof a number of micro projections having a height of 10 to 20 nm measured by atomic force microscopy (AFM) of 5 to 200/100 μm².

3. The magnetic recording medium according to claim 1, wherein the radiation curing compound has a viscosity of 1,000 mPa·s or less at 25° C.

4. The magnetic recording medium according to claim 1, wherein the binder of the at least one magnetic layer comprises a polyurethane resin having a glass transition temperature of 100° C. to 200° C.

5. The magnetic recording medium according to claim 4, wherein the polyurethane resin has a cyclic structure.

6. The magnetic recording medium according to claim 5, wherein the cyclic structure is an aromatic ring or a cyclohexane ring.

7. The magnetic recording medium according to claim 4, wherein the polyurethane resin has a polyol/chain extension agent/diisocyanate compound composition of 0 to 30 wt %/25 to 45 wt %/35 to 60 wt %.

8. The magnetic recording medium according to claim 1, wherein the radiation curing compound is a difunctional acrylate or methacrylate compound.

9. The magnetic recording medium according to claim 1, wherein the radiation-cured layer has a thickness of 0.1 to 1.0 μm.

10. The magnetic recording medium according to claim 1, wherein the lower layer is a non-magnetic layer comprising a non-magnetic powder dispersed in a binder.

11. The magnetic recording medium according to claim 1, wherein the non-magnetic layer has a thickness of 1.0 to 2.0 μm.

12. The magnetic recording medium according to claim 1, wherein the ferromagnetic powder is a cobalt-containing ferromagnetic iron oxide or a ferromagnetic alloy powder.

13. The magnetic recording medium according to claim 1, wherein the at least one magnetic layer is a single layer having a thickness of 0.05 to 0.5 μm.

14. The magnetic recording medium according to claim 1, wherein the at least one magnetic layer is a single layer having a thickness of 0.05 to 0.1 μm.

15. The magnetic recording medium according to claim 1, wherein the lower layer comprises a non-magnetic powder dispersed in a binder.

16. The magnetic recording medium according to claim 1, wherein the at least one magnetic layer comprises an antistatic agent.

17. The magnetic recording medium according to claim 1, wherein the thickness of the radiation-cured layer is 0.3 to 0.7 μm.

18. The magnetic recording medium according to claim 1, wherein the binder for dispersing the non-magnetic powder and/or the magnetic powder in the lower layer is the same as the binder for dispersing the ferromagnetic powder in the at least one magnetic layer.

19. The magnetic recording medium according to claim 16, wherein the antistatic agent is carbon black.

20. The magnetic recording medium according to claim 8, wherein the molecular weight of the difunctional acrylate or methacrylate compound is from 200-600.

21. The magnetic recording medium according to claim 8, wherein the difunctional acrylate or methacrylate compound is selected from the group consisting of diethylene glycol diacrylate, triethylene glycol diacrylate, dipropylene glycol diacrylate, tripropylene glycol diacrylate, hydrogenated bisphenol A diacrylate, hydrogenated bisphenol A dimethacrylate, tricyclodecane dimethanol diacrylate, tricyclodecane dimethanol dimethacrylate, and 5-ethyl-2-(2-hydroxy-1,1-dimethylethyl)-5-(hydroxymethyl)-1,3-dioxane diacrylate.

* * * * *